US012792373B2

(12) United States Patent
Berrangé

(10) Patent No.: US 12,792,373 B2
(45) Date of Patent: Nov. 10, 2026

(54) GRAPHICAL CONSOLE CONFIDENTIALITY FOR CONFIDENTIAL VIRTUAL MACHINES

(71) Applicant: Red Hat, Inc., Raleigh, NC (US)

(72) Inventor: Daniel Pierres Berrangé, Woking (GB)

(73) Assignee: Red Hat, Inc., Raleigh, NC (US)

( * ) Notice: Subject to any disclaimer, the term of this patent is extended or adjusted under 35 U.S.C. 154(b) by 525 days.

(21) Appl. No.: 18/326,268

(22) Filed: May 31, 2023

(65) Prior Publication Data

US 2024/0403092 A1 Dec. 5, 2024

(51) Int. Cl.
*G06F 9/455* (2018.01)

(52) U.S. Cl.
CPC ........ *G06F 9/4555* (2013.01); *G06F 9/45558* (2013.01); *G06F 2009/45562* (2013.01); *G06F 2009/4557* (2013.01)

(58) Field of Classification Search
CPC ............... G06F 9/4555; G06F 9/45558; G06F 2009/45562; G06F 2009/4557
USPC ............................................................... 718/1
See application file for complete search history.

(56) References Cited

U.S. PATENT DOCUMENTS 8,073,990 B1 * 12/2011 Baron ..................... G06F 13/28 710/22
10,853,494 B2 12/2020 Subramanian et al.
2010/0271379 A1 * 10/2010 Byford ................... G09G 5/363 345/545
2011/0302415 A1 * 12/2011 Ahmad ................... H04L 63/08 713/168
2020/0193039 A1 * 6/2020 Schlameuss ............ G06F 21/62
2021/0133334 A1 * 5/2021 Ji ............................ G06F 21/84
2022/0014566 A1 1/2022 Guim Bernat et al.

(Continued)

FOREIGN PATENT DOCUMENTS

EP 3706005 A1 9/2020
WO 2022272064 A1 12/2022

OTHER PUBLICATIONS

Melanson, Mike, "Google Launches Confidential VMs, GKE Nodes, to Encrypt Data In-Use", The New Stack, Sep. 8, 2020, https://thenewstack.io/google-launches-confidential-vms-gke-nodes-to-encrypt-data-in-use/?ref=morioh.com&utm_source=morioh.com, 4 pp. total.

*Primary Examiner* — April Y Blair
*Assistant Examiner* — Justin Che-Chun Tong
(74) *Attorney, Agent, or Firm* — Womble Bond Dickinson (US) LLP

(57) ABSTRACT

Systems and methods for securing pixel data in a virtual framebuffer and efficiently providing the secure pixel data are presented. The systems and methods partition a virtual framebuffer into a plurality of sectors, wherein each one of the plurality of sectors corresponds to one of a plurality of regions of a screen. The systems and methods encrypt first pixel data corresponding to the plurality of regions to produce encrypted first pixel data and storing the encrypted first pixel data in the plurality of sectors of the virtual framebuffer. The systems and methods modify a portion of the first pixel data to produce second pixel data, wherein the portion of the first pixel data corresponds to a first sector in the plurality of sectors. The systems and methods encrypt the second pixel data to produce encrypted second pixel data. The systems and methods update the first sector of the virtual framebuffer with the encrypted second pixel data.

20 Claims, 6 Drawing Sheets

(56) References Cited

U.S. PATENT DOCUMENTS

| | | | |
|---|---|---|---|
| 2022/0138286 A1 | 5/2022 | Zage et al. | |
| 2022/0391494 A1 | 12/2022 | Yang et al. | |
| 2023/0098117 A1 | 3/2023 | Wang et al. | |
| 2024/0202289 A1* | 6/2024 | Kaplan ............... | G06F 9/45558 |

* cited by examiner

GRAPHICAL CONSOLE CONFIDENTIALITY FOR CONFIDENTIAL VIRTUAL MACHINES

TECHNICAL FIELD

Aspects of the present disclosure relate to graphical console confidentiality for confidential virtual machines (CVMs). More particularly, aspects of the present disclosure relate to efficiently securing pixel data in a virtual framebuffer and providing the secure pixel data to a remote client.

BACKGROUND

Computer systems typically use a video graphics adapter to display content on a screen. The video graphics adapter uses a region of computer memory as an output mechanism that serves as a temporary storage area to store image data (pixel data) for a display screen, referred to as a "framebuffer." The framebuffer is typically a large block of memory that is mapped to the display hardware, allowing the video graphics adapter to write pixel data directly to the memory, which is then displayed on the screen without requiring constant interaction with the display hardware. Virtualized environments are similar in that when a virtual machine is responsible for generating pixel data, the virtual machine may use a virtual framebuffer as an output mechanism to store pixel data.

Confidential virtualization technology uses hardware and software techniques to enhance the security and confidentiality of virtualized environments by protecting portions of a virtual machine from being accessed by a hypervisor. Hardware-assisted virtualization uses a processor's hardware features to create a secure and isolated environment for virtual machines. Software-based virtualization provides enhanced security features such as secure boot and virtual trusted platform modules (vTPMs) to protect virtual machine instances.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
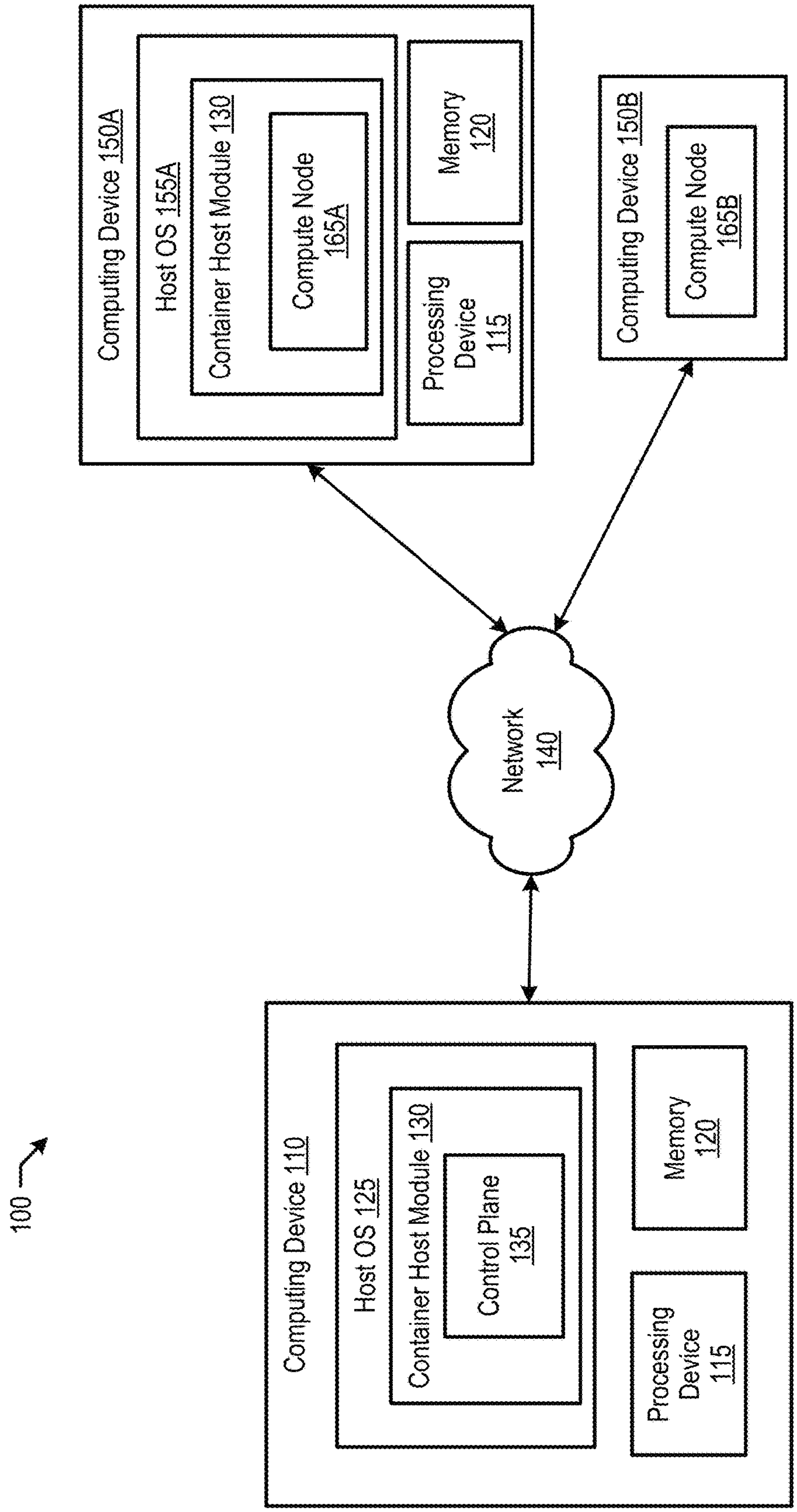
FIG. 1 is a block diagram that illustrates an example system, in accordance with some embodiments of the present disclosure.

As discussed above, confidential virtualization technology provides hardware-based and software-based approaches to enhance the security and confidentiality of virtualized environments. A virtual machine (VM) runs in a virtual environment and typically includes a guest operating system (guest OS), virtual machine firmware, and memory. Recent hardware developments include support for encrypting the virtual machine memory (e.g., random access memory (RAM)) to provide a "confidential VM" (CVM), thereby inhibiting a hypervisor or supervisor from understanding the memory contents. However, to communicate with virtual hardware devices (e.g., virtual graphics adapters), the CVM allocates a subset of pages as plain text at the discretion of the guest OS so as to provide the virtual hardware device with information. As such, the data in the subset of pages is not inherently confidential at the hardware level and, therefore, needs to be protected by the guest OS at the software level when required.

In a virtual environment, where the computer system instantiates virtual machines, the virtual machines use a virtual framebuffer for transferring pixel data from a virtual video graphics adapter to a screen. When the virtual environment uses hardware devices to provide CVMs as discussed above, the virtual framebuffer is part of the subset of pages not inherently confidential at the hardware level. When the virtual environment is internal (centralized), the hypervisor is typically trusted and a threat that the hypervisor may maliciously access the virtual framebuffer is minimal. However, in a cloud-based environment, the cloud provider controls the hypervisor and the threat of the hypervisor maliciously accessing the virtual framebuffer increases. In addition, there is a risk of an inadvertent confidentiality breach if the guest OS in the virtual machine should accidentally render sensitive information on the virtual framebuffer.

The present disclosure provides an approach that addresses the above-noted and other deficiencies by partitioning a virtual framebuffer into multiple sectors, each one of the sectors corresponding to one of multiple regions of a screen. The approach encrypts first pixel data corresponding to the multiple regions to produce encrypted first pixel data, and stores the encrypted first pixel data in the multiple sectors of the virtual framebuffer. The approach then modifies a portion of the first pixel data, corresponding to a first sector, to produce second pixel data. The approach encrypts the second pixel data to produce encrypted second pixel data, and then updates the first sector of the virtual framebuffer with the encrypted second pixel data.

In some embodiments, after updating the first sector with encrypted second pixel data, the virtual framebuffer includes the encrypted second pixel data in the first sector and a subset of the encrypted first pixel data in the remaining sectors.

In some embodiments, a virtual machine includes a guest operating system and the virtual framebuffer, and a remote client includes the screen and communicates with the virtual machine. The approach generates a mapping rule that is authorized by both the guest operating system and the remote client, and then maps, the sectors of the virtual framebuffer to the regions of the screen based on the mapping rule. Each of the regions includes a block of pixels corresponding to the screen. In some embodiments, the approach receives, from the guest operating system, a sector size corresponding to virtual framebuffer partitioning. The approach sends the sector size to the remote client and includes the sector size in the mapping rule. In some embodiments, the hypervisor detects the first sector update and sends the encrypted second pixel data from the first sector to the remote client.

In some embodiments, the virtual machine requests an attestation report and sends the attestation report to an attestation service. Then, the virtual machine receives a secret from the attestation service in response to the attestation service verifying the attestation report. The virtual machine then utilizes the secret to encrypt the first pixel data and the second pixel data. In some embodiments, the secret received by the virtual machine is generated by the remote client.

As discussed herein, the present disclosure provides an approach that improves the operation of a computer system by encrypting pixel data at a sector level in a virtual framebuffer and providing the sector level encrypted pixel data to a remote client. Due to the dynamically changing nature of the pixel data in the virtual framebuffer, encrypting the entire contents of the virtual framebuffer as a block and transferring the encrypted pixel data to a remote client each time a pixel changes would require a substantial amount of resources. The present disclosure improves upon these operations by efficiently encrypting and transferring pixel data in blocks at the sector level. In addition, the present disclosure provides an improvement to the technological field of confidential virtual machines by encrypting the previously unencrypted pixel data in sectors to protect against a malicious hypervisor.

FIG. 1 is a block diagram that illustrates an example system 100. As illustrated in FIG. 1, system 100 includes a computing device 110, and a plurality of computing devices 150. The computing devices 110 and 150 may be coupled to each other (e.g., may be operatively coupled, communicatively coupled, may communicate data/messages with each other) via network 140. Network 140 may be a public network (e.g., the Internet), a private network (e.g., a local area network (LAN) or wide area network (WAN)), or a combination thereof. In some embodiments, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g., cell towers), etc. In some embodiments, the network 140 may be an L3 network. The network 140 may carry communications (e.g., data, message, packets, frames, etc.) between computing device 110 and computing devices 150. Each of computing devices 110 and 150 may include hardware such as processing device 115 (e.g., processors, central processing units (CPUs)), memory 120 (e.g., random access memory 120 (e.g., RAM)), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110. Each computing device may comprise any suitable type of computing device or machine that has a programmable processor including, for example, server computers, desktop computers, laptop computers, tablet computers, smartphones, set-top boxes, etc. In some examples, each of the computing devices 110 and 150 may comprise a single machine or may include multiple interconnected machines (e.g., multiple servers configured in a cluster). The computing devices 110 and 150 may be implemented by a common entity/organization or may be implemented by different entities/organizations. For example, computing device 110 may be operated by a first company/corporation and one or more computing devices 150 may be operated by a second company/corporation. Each of computing devices 110 and 150 may execute or include an operating system (OS) such as host OS 125 and host OS 155 respectively, as discussed in more detail below. The host OS of a computing devices 110 and 150 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a container orchestration engine) while computing devices 150 may each implement a compute node (e.g., as part of the container orchestration engine).

In some embodiments, a container orchestration engine 130 (referred to herein as container host 130), may execute on the host OS 125 of computing device 110 and the host OS 155 of computing device 150, as discussed in further detail herein. The container host module 130 may be a platform for developing and running containerized applications and may allow applications and the data centers that support them to expand from just a few machines and applications to thousands of machines that serve millions of clients. Container host 130 may provide an image-based deployment module for creating containers and may store one or more image files for creating container instances. Many application instances can be running in containers on a single host without visibility into each other's processes, files, network, and so on. Each container may provide a single function (often called a "micro-service") or component of an application, such as a web server or a database, though containers can be used for arbitrary workloads. In this way, the container host 130 provides a function-based architecture of smaller, decoupled units that work together.

Container host 130 may include a storage driver (not shown), to manage the contents of an image file including the read only and writable layers of the image file. The storage driver may be a type of union file system which allows a developer to overlay one file system on top of another. Changes may be recorded in the upper file system, while the lower file system (base image) remains unmodified. In this way, multiple containers may share a file-system image where the base image is read-only media.

An image file may be stored by the container host 130 or a registry server. In some embodiments, the image file may include one or more base layers. An image file may be shared by multiple containers. When the container host 130 creates a new container, it may add a new writable (e.g., in-memory) layer on top of the underlying base layers. However, the underlying image file remains unchanged. Base layers may define the runtime environment as well as the packages and utilities necessary for a containerized application to run. Thus, the base layers of an image file may each comprise static snapshots of the container's configuration and may be read-only layers that are never modified. Any changes (e.g., data to be written by the application running on the container) may be implemented in subsequent (upper) layers such as in-memory layer. Changes made in the in-memory layer may be saved by creating a new layered image.

While the container image is the basic unit containers may be deployed from, the basic units that the container host 130 may work with are called pods. A pod may refer to one or more containers deployed together on a single host, and the smallest compute unit that can be defined, deployed, and managed. Each pod is allocated its own internal IP address, and therefore may own its entire port space. Containers within pods may share their local storage and networking. In some embodiments, pods have a lifecycle in which they are defined, they are assigned to run on a node, and they run until their container(s) exit or they are removed based on their policy and exit code. Although a pod may contain more than one container, the pod is the single unit that a user may deploy, scale, and manage. The control plane 135 of the container host 130 may include replication controllers (not shown) that indicate how many pod replicas are required to run at a time and may be used to automatically scale an application to adapt to its current demand.

By their nature, containerized applications are separated from the operating systems where they run and, by extension, their users. The control plane 135 may expose applications to internal and external networks by defining network policies that control communication with containerized applications (e.g., incoming HTTP or HTTPS requests for services inside the compute nodes 165).

A typical deployment of the container host 130 may include a control plane 135 and compute nodes 165, including compute nodes 165A and 165B (also referred to as compute machines). The control plane 135 may include REST APIs which expose objects as well as controllers which read those APIs, apply changes to objects, and report status or write back to objects. The control plane 135 manages workloads on the compute nodes 165 and also executes services that are required to control the compute nodes 165. For example, the control plane 135 may run an API server that validates and configures the data for pods, services, and replication controllers as well as provides a focal point for the compute nodes 165's shared state. The control plane 135 may also manage the logical aspects of networking and virtual networks. The control plane 135 may further provide a clustered key-value store (not shown) that stores the compute nodes 165's shared state. The control plane 135 may also monitor the clustered key-value store for changes to objects such as replication, namespace, and service account controller objects, and then enforce the specified state.

The compute nodes 165 are where the actual workloads requested by users run and are managed. The compute nodes 165 advertise their capacity and a scheduler (not shown), which is part of the control plane 135, determines which compute nodes 165 containers and pods will be started on. Each compute node 165 includes functionality to accept and fulfill requests for running and stopping container workloads, and a service proxy, which manages communication for pods across compute nodes 165. A compute node 165 may be implemented as a virtual server, logical container, or GPU, for example. Compute node 165 may be implemented as a virtual machine that encrypts graphical pixel data to inhibit access by a hypervisor as discussed herein.

Figure 2:
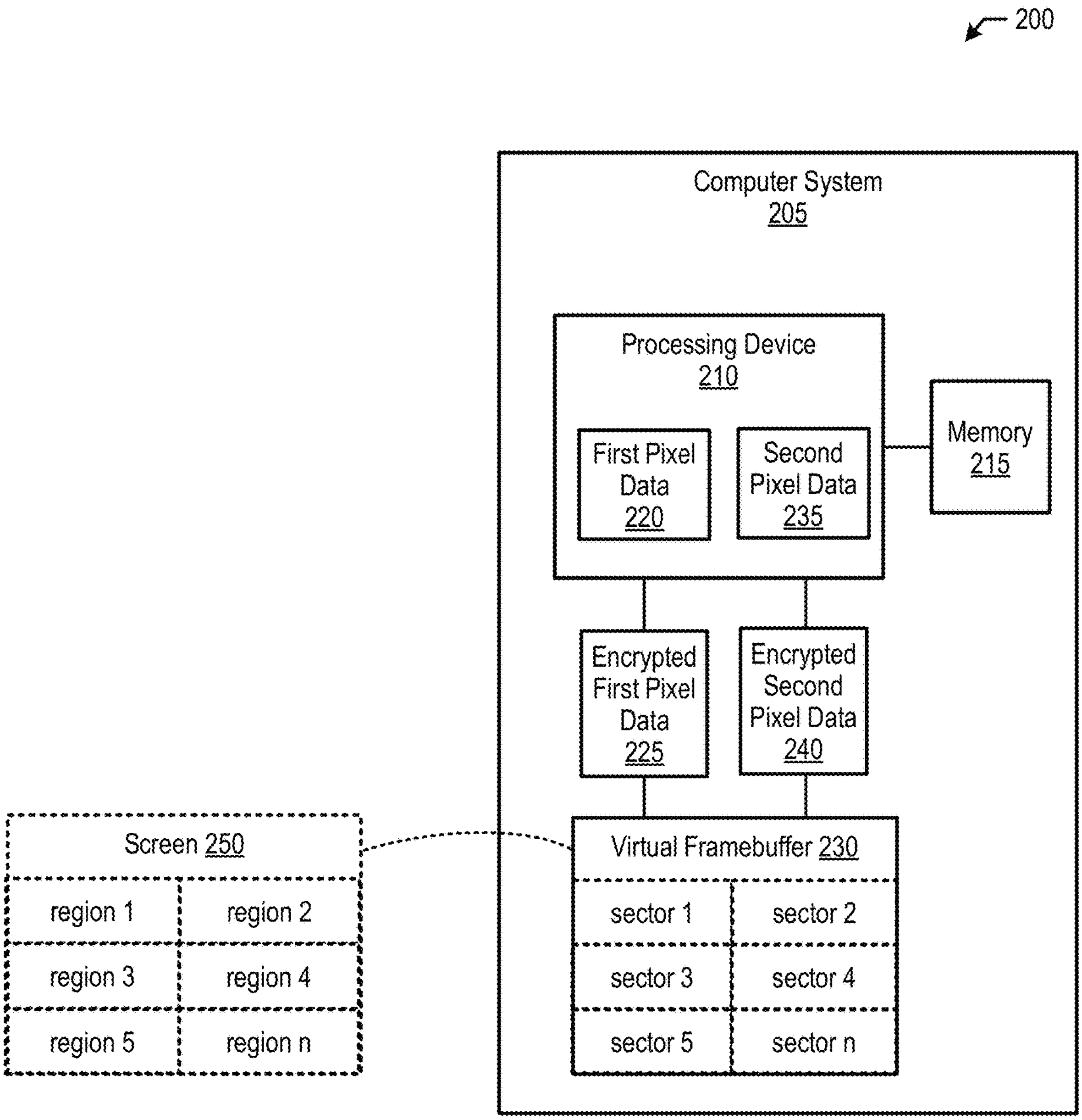
FIG. 2 is a block diagram that illustrates an example system for encrypting pixel data in sectors that correspond to regions of a display screen, in accordance with some embodiments of the present disclosure.

FIG. 2 is a block diagram that illustrates an example system for encrypting pixel data in sectors that correspond to regions of a display screen, in accordance with some embodiments of the present disclosure.

Diagram 200 shows computer system 205, which includes processing device 210, memory 215, and virtual framebuffer 230. Memory 215 stores instructions that processing device 210 executes, and virtual framebuffer 230 or may not be part of memory 215. During execution, processing device 210 partitions virtual framebuffer 230 into multiple sectors (sectors 1, 2, 3, 4, 5, n) that correspond to multiple regions on screen 250 (regions 1, 2, 3, 4, 5, n). Screen 250 may be physically located at a remote client, such as that shown in FIG. 3. By partitioning virtual framebuffer 230 into sectors, processing device 210 is able to encrypt pixel data at the sector level instead of encrypting the entire contents of the virtual framebuffer whenever the pixel data changes.

Once processing device 210 partitions virtual framebuffer 230 into sectors, processing device 210 encrypts first pixel data 220 using a secret (e.g., encryption key, password, etc.) provided, for example, by an attestation service to produce encrypted first pixel data 225. In some embodiments, first pixel data 220 is initial pixel data and corresponds to regions 1-n of screen 250. Processing device 210 stores encrypted first pixel data 225 in virtual framebuffer 230 (e.g., sectors 1-n). In some embodiments, the pixel data corresponding to region 1 of screen 250 is stored in sector 1 of virtual framebuffer 230, the pixel data corresponding to region 2 of screen 250 is stored in sector 2 of virtual framebuffer 230, etc.

Then, processing device 210 modifies a portion of the first pixel data (e.g., receives a mouse click, a keystroke), which corresponds to a first sector (e.g., sector 1 of virtual framebuffer 230), to produce second pixel data 235. Then, processing device 210 uses the secret to encrypt second pixel data 235 for the first sector to produce encrypted second pixel data 240. In turn, processing device updates the first sector of virtual framebuffer 230 with encrypted second pixel data 240. At this point, in some embodiments, virtual framebuffer 230 includes encrypted second pixel data 240 in sector 1, and includes encrypted first pixel data 225 in sectors 2-n. In turn, a hypervisor, such as hypervisor 340 shown in FIG. 3, detects the change in data within sector 1 and transfers the updated sector data to a remote client (see FIG. 3 and corresponding text for further details).

Figure 3:
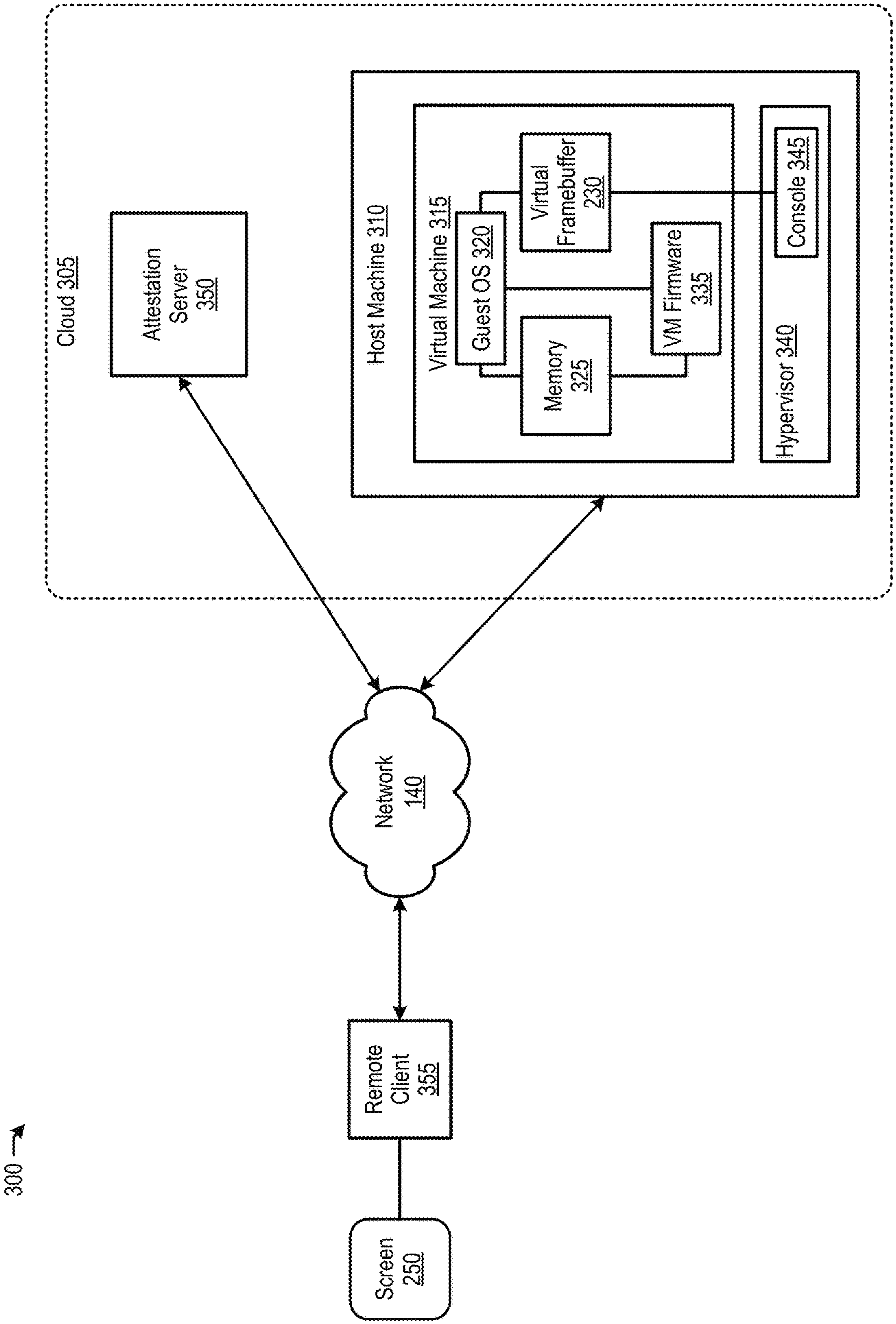
FIG. 3 is a block diagram that illustrates an example system that enables a virtual machine to efficiently encrypt pixel data and provide the encrypted pixel data to a remote client, in accordance with some embodiments of the present disclosure.

FIG. 3 is a block diagram that illustrates an example system that enables a virtual machine to encrypt pixel data and efficiently provide the encrypted pixel data to a remote client, in accordance with some embodiments of the present disclosure.

Diagram 300 shows remote client 355 communicating with attestation server 350 and host machine 310 in cloud 305. In some embodiments, attestation server 350 operates in a separate cloud environment than host machine 310. Virtual machine 315 operates on host machine 310, which includes guest OS 320, memory 325, virtual framebuffer 230, and virtual machine firmware 335.

When virtual machine 315 executes on cloud 305, virtual machine 315 provides graphical information using a technique referred to as remote display. Remote display allows remote client 355 to connect to virtual machine 315 and receive a stream of graphical data that is rendered on remote client 355's screen 250. Remote client 355 typically runs a remote display client application, which connects to a remote console (console 345). The remote console sends graphical data to remote client 355, which renders the graphical content on the screen 250.

Host machine 310 may include hardware (e.g., CPU) that provides a "confidential VM" (CVM) environment. As discussed above, the CVM environment secures memory 325 but does not secure virtual framebuffer 230. As such, as discussed herein, remote client 355, attestation server 350, and virtual machine 315 perform operations to establish a secret, use the secret to encrypt pixel data, and efficiently transfer encrypted pixel data in sectors.

In some embodiments, remote client 355 generates a secret (e.g., a password or encryption key) and sends the secret with a unique virtual machine identifier to attestation server 350 through network 140. Attestation server 350 stores the secret with the unique virtual machine identifier combination in a storage area. Remote client 355 then sends a request to hypervisor 340 to run virtual machine 315 with the unique virtual machine identifier.

When hypervisor 340 starts instantiates virtual machine 315, virtual machine 315 is allocated a portion of host machine 310's resources, including CPU, memory, and storage. Hypervisor 340 also creates console 345 to communicate with virtual framebuffer 230. Hypervisor 340 manages the interaction between virtual framebuffer 230 and virtual machine 315's guest OS 320 to provide the necessary hardware abstraction layer.

After instantiation, virtual machine 315 requests an attestation report from host machine 310. The attestation report includes various cryptographic measurements reflecting the configuration of virtual machine 315, such as aspects of the executing hardware, the firmware on which the virtual machine 315 runs, and a unique virtual machine identifier.

Virtual machine 315 sends the attestation report, which includes virtual machine 315's unique identifier, to attestation server 350. Attestation server 350 validates virtual machine 315 based on the attestation report and retrieves the stored secret corresponding to the unique virtual machine identifier. Attestation server 350 then sends the secret to virtual machine 315 through network 140. In turn, virtual machine 315 (virtual machine firmware 335) stores the secret at a particular location in memory 325, which is protected from a malicious hypervisor by the CVM environment as discussed above.

Now that virtual machine firmware 335 has the secret secured in memory 325, guest OS 320 may be booted. When guest OS 320 starts and initializes a virtual display, guest OS 320 looks for the secret in the particular location in memory 325. Guest OS 320 uses the secret to encrypt pixel data and store the encrypted pixel data in virtual framebuffer 230. The encryption may be performed in kernel space or in user space, depending on how virtual machine 315's corresponding graphics software stack is designed.

In some embodiments, virtual machine 315 treats virtual framebuffer 230 as a random access storage device and partitions virtual framebuffer 230 into sectors that map to regions of screen 250. Virtual machine 315 then encrypts only a portion of virtual framebuffer 230 (e.g., a sector) at any given time based on relative locations of pixel data changes. For example, if screen 250 is 2000 pixels wide by 1000 pixels high and is partitioned into regions, such as 16 pixels by 16 pixels, then virtual machine 315 applies encryption to each 16 by 16 pixel sector block in virtual framebuffer 230 independently as its corresponding pixel data changes.

Hypervisor 340 detects changes to the encrypted pixel data in virtual framebuffer 230 from guest OS 320. In some embodiments, hypervisor 340 periodically scans for changes in virtual framebuffer 230. In some embodiments, guest OS 320 sends a message to hypervisor 340 that an updated occurred in a particular sector(s). When hypervisor 340 detects changes, hypervisor 340 retrieves the encrypted pixel data for the corresponding sector and sends the updated encrypted pixel data over network 140 to remote client 355. Remote client 355 uses the secret to decrypt the encrypted pixel data and display the decrypted pixel data on screen 250. In some embodiments, guest OS 320 and remote client 355 pre-determine the sector/region size.

In some embodiments, to improve efficiency, hypervisor 340 may wait a pre-determined amount of time before sending the sector update of encrypted pixel data. For example, if one particular pixel has changed over and over again in 10 milliseconds, hypervisor 340 may wait to send the final result instead of sending an update every 10 milliseconds. In some embodiments, based on optimization approaches, hypervisor 340 may send encrypted pixel data corresponding to a partial region of screen 250 or may send a cumulative region that partially covers one of the sectors.

In some embodiments, if the virtual machine 315 uses an encrypted disk, the encrypted disk may include the secret at some well-known file path. In some embodiments, assuming that virtual machine 315 has a trusted platform module (TPM), the secret may be sealed against the TPM and then the secret is stored in the disk image. In these embodiments, when virtual machine 315 boots up, virtual machine 315 acquires the secret from the disk image once the attestation of the TPM passes to prove the integrity of the TPM. In some embodiments, guest OS 320 encrypts an encryption key using the secret from the TPM. Then, the encrypted encryption key is stored in the disk image. When virtual machine 315 boots up, the attestation report proves the integrity of the TPM and releases the TPM state. Once the TPM is unlocked, the secret is unlocked and available. In this embodiment, guest OS 320 does not need to interact with attestation server 350. Attestation still occurs but is transparent to guest OS 320.

In some embodiments, each scanline (row of pixels) is treated as a sector. In some embodiments, virtual framebuffer 230 is divided into N×N pixel blocks. Changing a single pixel requires the entire virtual sector to be updated. In some embodiments, to ensure that partial sector updates are avoided, the graphics adapter may be para-virtualized (as opposed to pure emulations of physical devices). In these embodiments, hypervisor 340 and guest OS 320 agree on the sector size for virtual framebuffer 230, and the sector size is communicated back to remote client 355. In some embodiments, virtual framebuffer 230's width and height are both multiples of the pixel block size. If they are not a multiple, however, virtual machine 315 determines how to manage the partial edge sectors. In some embodiments, the edge sectors are declared smaller than the other sectors. For example, the last sector on each line may be encoded as a 10×16 block, instead of the normal 16×16 block. In some embodiments, padding is provided in video RAM regions. The padding regions would be transmitted to remote client 355 but not displayed on screen 250.

Figure 4:
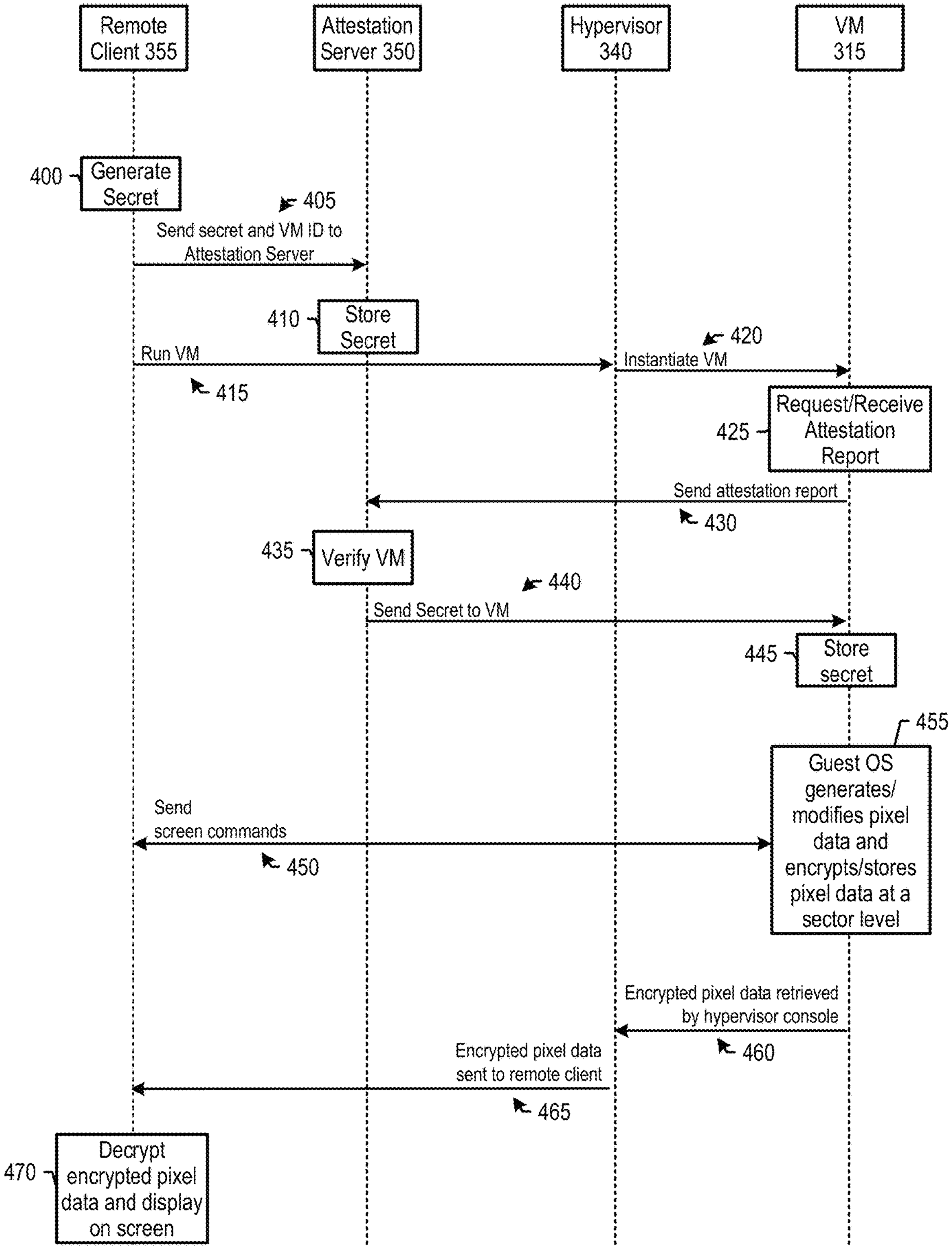
FIG. 4 is a diagram that illustrates interactions between entities to establish a common secret between a remote client and virtual machine for encrypting and decrypting pixel data, in accordance with some embodiments of the present disclosure.

FIG. 4 is a diagram that illustrates interactions between entities to establish a common secret between a remote client and virtual machine for encrypting and decrypting pixel data, in accordance with some embodiments of the present disclosure.

At 400, remote client 355 generates a secret, such as a password, an encryption key, or a combination thereof. At 405, remote client 355 sends the secret and a unique virtual machine identifier to attestation server 350. The unique virtual machine identifier will eventually allow attestation server 350 to associate virtual machine 315 to the secret. This enables remote client 355 to generate multiple different secrets and communicate with multiple virtual machines. At

410, attestation server 350 stores the secret with the unique virtual machine identifier (e.g., an entry in a temporary storage area). In some embodiments, instead of remote client 355 generating the secret, attestation server 350 generates the secret and sends the secret to remote client 355.

At 415, remote client 355 sends a command to hypervisor 340 to run a virtual machine (virtual machine 315) using the unique virtual machine identifier and, at 420, hypervisor 340 instantiates virtual machine 315. At 425, virtual machine 315 requests/receives an attestation report from host machine 310. In some embodiments, the attestation report includes hardware information, such as a model number of the underlying processor so that virtual machine 315 can determine whether the processor supports a CVM environment.

At 430, virtual machine 315 sends a message to attestation server 350 that includes the attestation report and, at 435, attestation server 350 verifies the virtual machine via the attestation report. When verified, attestation server 350 sends the secret to virtual machine 315 at 440. In some embodiments, the message includes a mapping rule for mapping virtual framebuffer 230 to screen 250.

At 445, virtual machine 315 stores the secret in memory, such as memory 325 shown in FIG. 3. In some embodiments, virtual machine 315 partitions virtual framebuffer 230 into sectors 1-n based on the mapping rule included in the message received from attestation server.

At 450, remote client 355 sends commands, such as mouse movement commands or keyboard keystroke commands. At 455, virtual machine 315's guest OS 320 generates/modifies pixel data and encrypts/stores pixel data in blocks at a sector level. For example, guest OS 320 may generate first pixel data based on a login screen, and generate subsequent pixel data as remote client 355 provides login information (e.g., keystroke commands).

At 460, hypervisor 340 detects changes in virtual framebuffer 230 and retrieves the encrypted pixel data at a sector level accordingly. At 465, hypervisor 340 sends the modified encrypted pixel data to remote client 355. At 470, remote client 355 decrypts the encrypted pixel data using the secret and displays the decrypted pixel data on screen 250.

Figure 5:
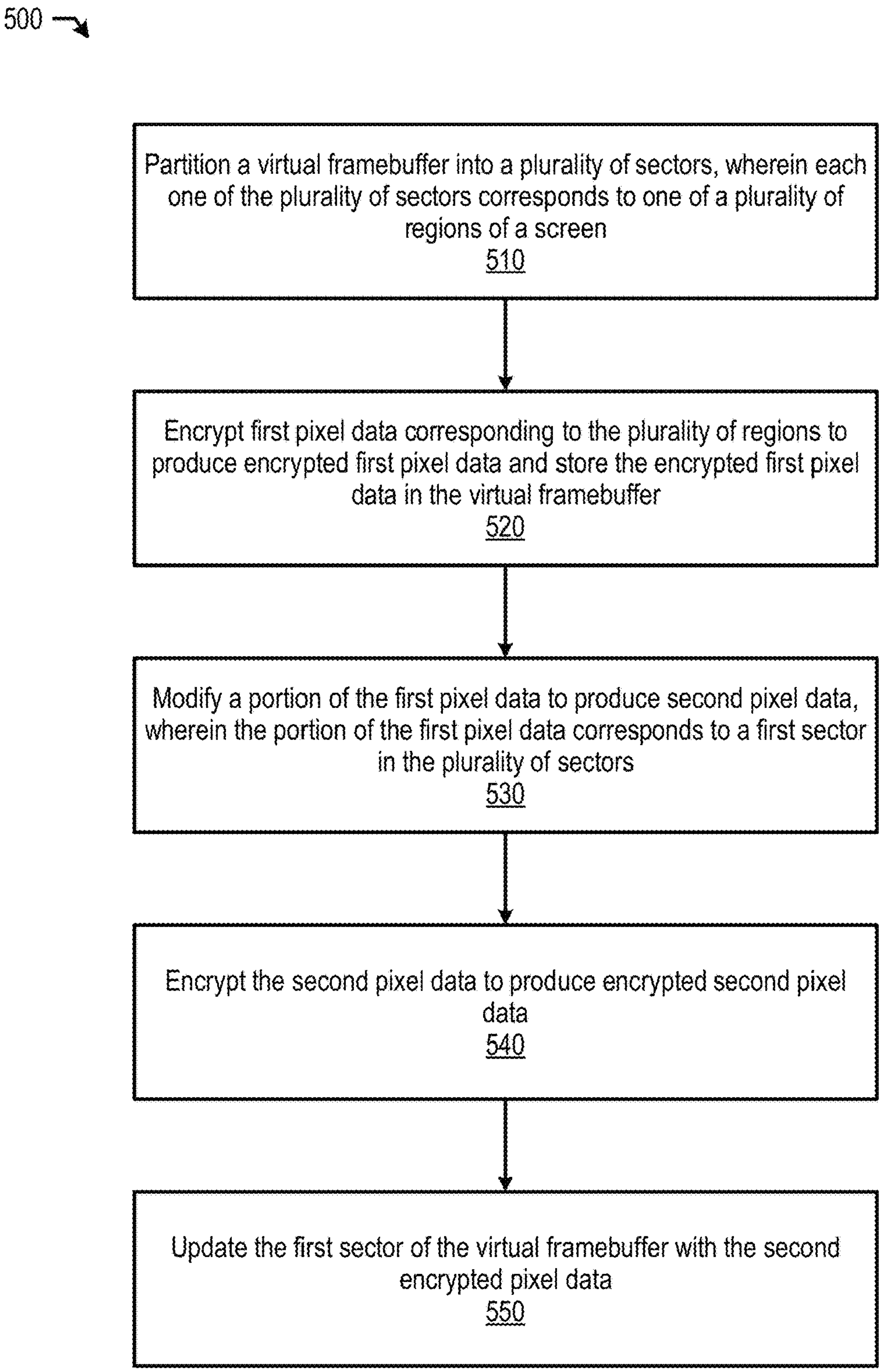
FIG. 5 is a flow diagram of a method for efficiently encrypting and updating pixel data, in accordance with some embodiments.

FIG. 5 is a flow diagram of a method for efficiently encrypting and updating pixel data, in accordance with some embodiments. Method 500 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by processing device 115, processing device 210, host machine 310, or a combination thereof as shown in FIGS. 1-3.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

With reference to FIGS. 5, method 500 begins at block 510, where processing logic partitions a virtual framebuffer into a plurality of sectors, wherein each one of the plurality of sectors corresponds to one of a plurality of regions of a screen. In some embodiments, the virtual framebuffer is on a virtual machine running a guest operating system, and the screen is part of a remote client. In some embodiments, processing logic generates a mapping rule that is authorized by both the guest operating system and the remote client. Processing logic maps, based on the mapping rule, the plurality of sectors of the virtual framebuffer to the plurality of regions of the screen. Each one of the plurality of regions includes a block of pixels corresponding to the screen. In some embodiments, processing logic receives a sector size corresponding to the partitioning of the virtual framebuffer, sends the sector size to the remote client, and includes the sector size in the mapping rule.

At block 520, processing logic encrypts first pixel data corresponding to the plurality of regions to produce encrypted first pixel data and stores the encrypted first pixel data in the virtual framebuffer. At block 530, processing logic determines a change from the first pixel data to second pixel data corresponding to a first region in the plurality of regions. The first region corresponds to a first sector in the plurality of sectors of the virtual framebuffer.

At block 540, processing logic encrypts the second pixel data to produce encrypted second pixel data and, at block 550, processing logic updates the first sector of the virtual framebuffer with the encrypted second pixel data. At this point, in some embodiments, the virtual framebuffer includes the encrypted second pixel data in the first sector and a subset of the encrypted first pixel data in the remaining of sectors. In some embodiments, processing logic detects the updating of the first sector of the virtual framebuffer with the encrypted second pixel data and sends the encrypted second pixel data from the first sector to the remote client.

In some embodiments, processing logic requests an attestation report responsive to launching the virtual machine and sends the attestation report to an attestation service. Processing logic then receives a secret at the virtual machine from the attestation service in response to the attestation service verifying the attestation report. Then, the virtual machine utilizes the secret to encrypt the first pixel data and the second pixel data. In some embodiments, the secret that is received by the virtual machine is generated by the remote client.

Figure 6:
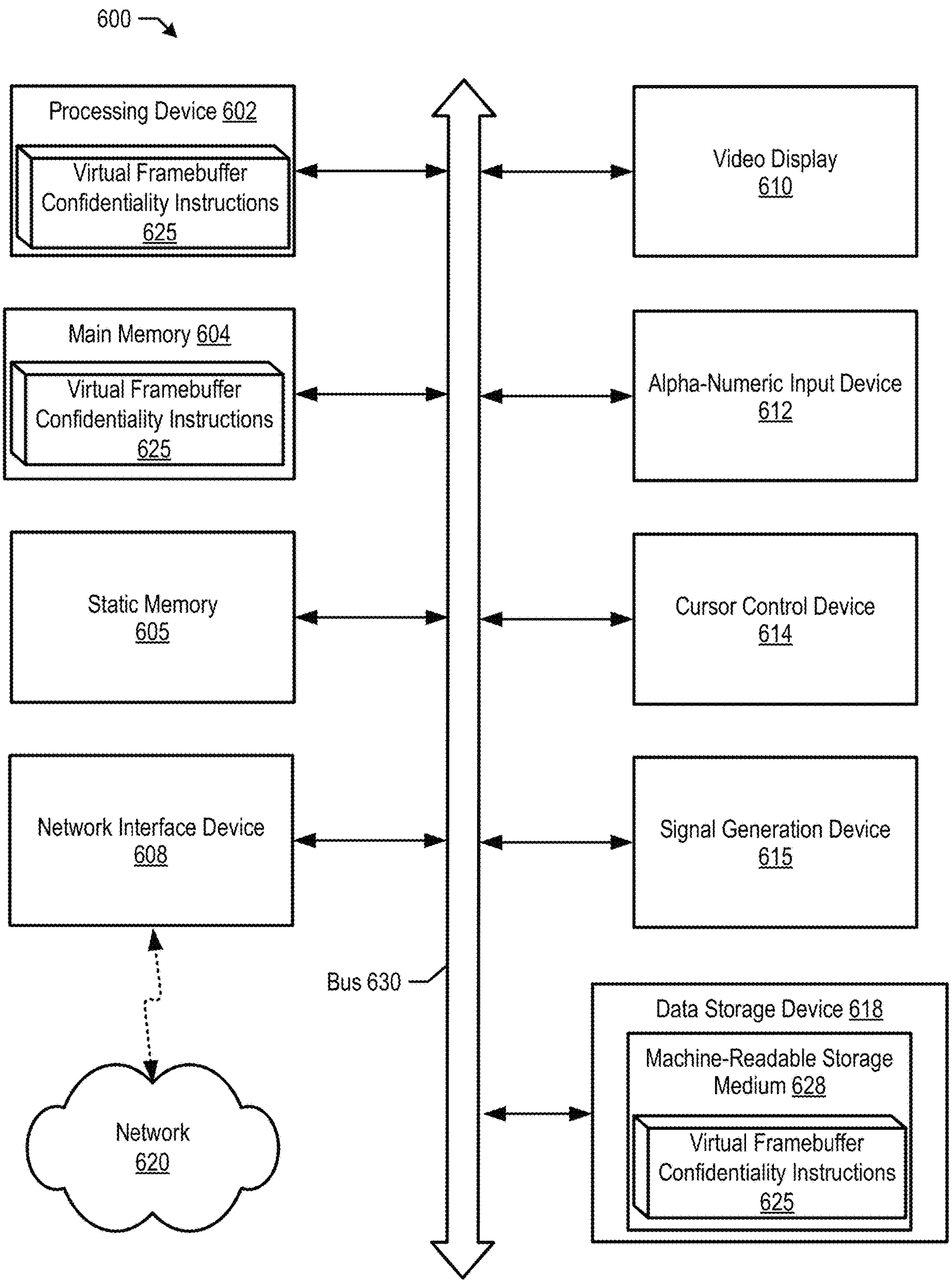
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for intelligently scheduling containers.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server.

The exemplary computer system 600 includes a processing device 602, a main memory 604 (e.g., read-only memory (ROM), flash memory, dynamic random access memory (DRAM), a static memory 605 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computer system 600 may further include a network interface device 608 which may communicate with a network 620. Computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 615 (e.g., a speaker). In some embodiments, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute virtual framebuffer confidentiality instructions 625, for performing the operations and steps discussed herein.

The data storage device 618 may include a machine-readable storage medium 628, on which is stored one or more sets of virtual framebuffer confidentiality instructions 625 (e.g., software) embodying any one or more of the methodologies of functions described herein. The virtual framebuffer confidentiality instructions 625 may also reside, completely or at least partially, within the main memory 604 or within the processing device 602 during execution thereof by the computer system 600; the main memory 604 and the processing device 602 also constituting machine-readable storage media. The virtual framebuffer confidentiality instructions 625 may further be transmitted or received over a network 620 via the network interface device 608.

The machine-readable storage medium 628 may also be used to store instructions to perform a method for intelligently scheduling containers, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "partitioning," "encrypting," "modifying," "updating," "generating," "mapping," "receiving," "sending," "including," "detecting," "requesting," "utilizing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a non-transitory computer readable storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:

partitioning a virtual framebuffer into a plurality of sectors, wherein each one of the plurality of sectors corresponds to one of a plurality of regions of a screen;

encrypting first pixel data corresponding to the plurality of regions to produce encrypted first pixel data and storing the encrypted first pixel data in the plurality of sectors of the virtual framebuffer;

retrieving, by a processing device executing a hypervisor, the encrypted first pixel data from the virtual framebuffer;

sending, by the hypervisor, the encrypted first pixel data to a remote client, wherein the first pixel data is inaccessible to the hypervisor;

modifying, by a processing device, a portion of the first pixel data to produce second pixel data, wherein the portion of the first pixel data corresponds to a first sector in the plurality of sectors;

encrypting the second pixel data to produce encrypted second pixel data;

updating the first sector of the virtual framebuffer with the encrypted second pixel data;

retrieving, by the hypervisor, the encrypted second pixel data from the first sector of the virtual framebuffer; and sending, by the hypervisor, the encrypted second pixel data to the remote client, wherein the second pixel data is inaccessible to the hypervisor.

2. The method of claim 1, wherein, after the updating, the virtual framebuffer comprises the encrypted second pixel data in the first sector and a subset of the encrypted first pixel data in the remaining plurality of sectors.

3. The method of claim 1, wherein a virtual machine comprises the virtual framebuffer and a guest operating system, the method further comprising:

generating a mapping rule that is authorized by the guest operating system; and mapping the plurality of sectors of the virtual framebuffer to the plurality of regions of a screen of a remote client of the virtual machine based on the mapping rule, wherein each one of the plurality of regions comprises a block of pixels corresponding to the screen.

4. The method of claim 3, further comprising:

receiving, from the guest operating system, a sector size corresponding to the partitioning of the virtual framebuffer;

sending the sector size to the remote client; and including the sector size in the mapping rule.

5. The method of claim 4, further comprising:

detecting, by the hypervisor, the updating of the first sector of the virtual framebuffer with the encrypted second pixel data, wherein the sending the encrypted second pixel data by the hypervisor is in response to detecting the updating of the first sector.

6. The method of claim 3 further comprising:

requesting an attestation report responsive to instantiating the virtual machine;

sending the attestation report to an attestation service;

receiving a secret at the virtual machine from the attestation service in response to the attestation service verifying the attestation report; and utilizing, by the virtual machine, the secret to encrypt the first pixel data and the second pixel data.

7. The method of claim 6, wherein the secret that is received by the virtual machine is generated by the remote client.

8. A system comprising:

a processing device; and a memory, operatively coupled with the processing device, to store instructions that, when executed by the processing device, cause the processing device to:

partition a virtual framebuffer into a plurality of sectors, wherein each one of the plurality of sectors corresponds to one of a plurality of regions of a screen;

encrypt first pixel data that corresponds to the plurality of regions to produce encrypted first pixel data and store the encrypted first pixel data in the plurality of sectors of the virtual framebuffer;

retrieve, by the processing device executing a hypervisor, the encrypted first pixel data from the virtual framebuffer;

send, by the hypervisor, the encrypted first pixel data to a remote client, wherein the first pixel data is inaccessible to the hypervisor;

modify a portion of the first pixel data to produce second pixel data, wherein the portion of the first pixel data corresponds to a first sector in the plurality of sectors;

encrypt the second pixel data to produce encrypted second pixel data;

update the first sector of the virtual framebuffer with the encrypted second pixel data;

retrieve, by the hypervisor, the encrypted second pixel data from the first sector of the virtual framebuffer; and send, by the hypervisor, the encrypted second pixel data to the remote client, wherein the second pixel data is inaccessible to the hypervisor.

9. The system of claim 8, wherein, after the update of the first sector, the virtual framebuffer comprises the encrypted second pixel data in the first sector and a subset of the encrypted first pixel data in the remaining plurality of sectors.

10. The system of claim 8, wherein a virtual machine operates on the processing device, and wherein the processing device, responsive to executing the instructions, further causes the system to:

generate a mapping rule that is authorized by a guest operating system that executes on the virtual machine; and map the plurality of sectors of the virtual framebuffer to the plurality of regions of a screen of a remote client of the virtual machine based on the mapping rule, wherein each one of the plurality of regions comprises a block of pixels that correspond to the screen.

11. The system of claim 10, wherein the processing device, responsive to executing the instructions, further causes the system to:

receive, from the guest operating system, a sector size that corresponds to the partition of the virtual framebuffer;

send the sector size to the remote client; and include the sector size in the mapping rule.

12. The system of claim 11, wherein the processing device, responsive to executing the instructions, further causes the system to:

detect, by the hypervisor, the update of the first sector of the virtual framebuffer with the encrypted second pixel data, wherein the sending the encrypted second pixel data by the hypervisor is in response to detecting the updating of the first sector.

13. The system of claim 10, wherein the processing device, responsive to executing the instructions, further causes the system to:

instantiate the virtual machine and request an attestation report;

send the attestation report to an attestation service;

receive a secret at the virtual machine from the attestation service in response to a verification of the attestation report by the attestation service; and utilize, by the virtual machine, the secret to encrypt the first pixel data and the second pixel data.

14. The system of claim 13, wherein the secret that is received by the virtual machine is generated by the remote client.

15. A non-transitory computer readable medium, having instructions stored thereon which, when executed by a processing device, cause the processing device to:

partition a virtual framebuffer into a plurality of sectors, wherein each one of the plurality of sectors corresponds to one of a plurality of regions of a screen;

encrypt first pixel data corresponding to the plurality of regions to produce encrypted first pixel data and store the encrypted first pixel data in the plurality of sectors of the virtual framebuffer;

retrieve, by the processing device executing a hypervisor, the encrypted first pixel data from the virtual framebuffer;

send, by the hypervisor, the encrypted first pixel data in the virtual framebuffer to a remote client, wherein the first pixel data is inaccessible to the hypervisor;

modify a portion of the first pixel data to produce second pixel data, wherein the portion of the first pixel data corresponds to a first sector in the plurality of sectors;

encrypt the second pixel data to produce encrypted second pixel data; and update the first sector of the virtual framebuffer with the encrypted second pixel data;

retrieve, by the hypervisor, the encrypted second pixel data from the first sector of the virtual framebuffer; and sending, by the hypervisor, the encrypted second pixel data to the remote client, wherein the second pixel data is inaccessible to the hypervisor.

16. The non-transitory computer readable medium of claim 15, wherein, after the update of the first sector, the virtual framebuffer comprises the encrypted second pixel data in the first sector and a subset of the encrypted first pixel data in the remaining plurality of sectors.

17. The non-transitory computer readable medium of claim 15, wherein a virtual machine operates on the processing device, and wherein the processing device is to:

generate a mapping rule that is authorized by a guest operating system that executes on the virtual machine; and map the plurality of sectors of the virtual framebuffer to the plurality of regions of a screen of a remote client of the virtual machine based on the mapping rule, wherein each one of the plurality of regions comprises a block of pixels that correspond to the screen.

18. The non-transitory computer readable medium of claim 17, wherein the processing device is to:

receive, from the guest operating system, a sector size that corresponds to the partition of the virtual framebuffer;

send the sector size to the remote client; and include the sector size in the mapping rule.

19. The non-transitory computer readable medium of claim 18, wherein the processing device is to:

detect, by the hypervisor, the update of the first sector of the virtual framebuffer with the encrypted second pixel data, wherein the sending the encrypted second pixel data by the hypervisor is in response to detecting the updating of the first sector.

20. The non-transitory computer readable medium of claim 17, wherein the processing device is to:

instantiate the virtual machine and request an attestation report;

send the attestation report to an attestation service;

receive a secret at the virtual machine from the attestation service in response to the attestation service verifying the attestation report; and utilize, by the virtual machine, the secret to encrypt the first pixel data and the second pixel data.

* * * * *